United States Patent
Margoscin et al.

(10) Patent No.: US 7,003,482 B1
(45) Date of Patent: Feb. 21, 2006

(54) MIDDLEWARE FOR BUSINESS TRANSACTIONS

(75) Inventors: Edward Margoscin, Austin, TX (US); Erica Quintana, Austin, TX (US); Gerald A. Williamson, Pflugerville, TX (US); Debra K. Zarley, Austin, TX (US)

(73) Assignee: Computer Sciences Corporation, Austin, TX (US)

( * ) Notice: Subject to any disclaimer, the term of this patent is extended or adjusted under 35 U.S.C. 154(b) by 0 days.

(21) Appl. No.: 09/459,260

(22) Filed: Dec. 10, 1999

(51) Int. Cl.
*G06F 17/60* (2006.01)

(52) U.S. Cl. .................. 705/35; 717/127; 717/136; 717/137; 718/19

(58) Field of Classification Search .............. 705/35; 709/218, 219, 250; 717/127, 136, 137; 718/19
See application file for complete search history.

(56) References Cited

U.S. PATENT DOCUMENTS

| | | | |
|---|---|---|---|
| 4,831,526 A | 5/1989 | Luchs et al. | |
| 5,182,705 A | 1/1993 | Barr et al. | |
| 5,253,164 A | 10/1993 | Holloway et al. | |
| 5,276,816 A | 1/1994 | Cavendish et al. | |
| 5,517,644 A | 5/1996 | Murdock | |
| 5,550,976 A | 8/1996 | Henderson et al. | |
| 5,557,515 A | 9/1996 | Abbruzzese et al. | |
| 5,564,043 A | 10/1996 | Siefert | |
| 5,717,747 A * | 2/1998 | Boyle et al. ........... | 379/201.03 |
| 5,745,901 A | 4/1998 | Entner et al. | |
| 5,768,506 A | 6/1998 | Randell | |
| 5,815,152 A | 9/1998 | Collier et al. | |
| 5,819,263 A | 10/1998 | Bromley et al. | |
| 5,864,875 A | 1/1999 | Van Huben et al. | |
| 5,870,711 A | 2/1999 | Huffman | |
| 5,909,683 A | 6/1999 | Miginiac et al. | |
| 5,950,169 A | 9/1999 | Borghesi et al. | |

(Continued)

FOREIGN PATENT DOCUMENTS

WO WO 02/15079 2/2002

OTHER PUBLICATIONS

Shah, Ashish; World Wide Web and Object Technology, Chapter 19, 1996.*

(Continued)

*Primary Examiner*—Jagdish N Patel
(74) *Attorney, Agent, or Firm*—Meyertons, Hood, Kivlin, Kowert & Goetzel, P.C.; Eric B. Meyertons

(57) ABSTRACT

A middleware program provides an interface between an input channel and a business transaction server. The middleware program receives data and commands from an interface program that is coupled to an input channel. The middleware program validates the data, orders the data, transforms the data into a form required by the server, sends the data to the server, and the middleware program receives the results of the business transaction from the server. The middleware program transforms the results into a form required by the interface program and sends the results to the interface program. The interface program displays the results. The middleware program may reduce the time required to create an interface to a channel. The middleware program moves business logic out of the server or legacy program and into a middle layer that may be easily integrated with many different types of visual or non-visual user interfaces. The architecture of the middleware program allows the middleware program to be easily used with a variety of different types of channels.

36 Claims, 6 Drawing Sheets

U.S. PATENT DOCUMENTS

| | | | |
|---|---|---|---|
| 5,960,404 A | | 9/1999 | Chaar et al. |
| 5,974,392 A | | 10/1999 | Endo |
| 5,991,733 A | | 11/1999 | Aleia et al. |
| 5,995,939 A | | 11/1999 | Berman et al. |
| 6,100,891 A | * | 8/2000 | Thorne .................. 345/854 |
| 6,112,209 A | * | 8/2000 | Gusack .................. 707/101 |
| 6,115,693 A | * | 9/2000 | McDonough et al. ....... 379/225 |
| 6,134,530 A | * | 10/2000 | Bunting et al. ........ 379/220.01 |
| 6,134,582 A | | 10/2000 | Kennedy |
| 6,223,165 B1 | | 4/2001 | Lauffer |
| 6,223,343 B1 | | 4/2001 | Hopwood et al. |
| 6,295,526 B1 | * | 9/2001 | Kreiner et al. .................. 707/1 |
| 6,330,551 B1 | | 12/2001 | Burchetta et al. |
| 6,389,400 B1 | | 5/2002 | Bushey et al. |
| 6,405,364 B1 | * | 6/2002 | Bowman-Amuah ......... 717/101 |
| 6,430,538 B1 | | 8/2002 | Bacon et al. |
| 6,460,036 B1 | | 10/2002 | Herz |
| 6,502,096 B1 | | 12/2002 | Siefert |
| 6,591,272 B1 | * | 7/2003 | Williams .................... 707/102 |
| 6,632,251 B1 | | 10/2003 | Rutten et al. |
| 6,714,914 B1 | | 3/2004 | Peters et al. |

OTHER PUBLICATIONS

Persistence Software Announces One of Industry's First Open Java Application Servers With Full Enterprise Java-Beans Support Business Wire Mar. 24, 1998.*
Borland, Russel, "Running Microsoft Outlook 97," Microsoft Press, 1997.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul/Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
U.S. Appl. No. 09/429,808 (5053-30600).
U.S. Appl. No. 10/337,923 (5053-32801).
U.S. Appl. No. 10/337,951 (5053-32901).
U.S. Appl. No. 10/337,950 (5053-33001).

* cited by examiner

AbsCode~PairedString
. end of name & type
True~False~0~0~27~Space
. end of exclusive/required/cap/minLength/maxLength/padding
. end of security table
. end of key names.
Void~Void
. end of security lvl/key values.
Not Applicable~N
Optional~O
Standard (rear wheels only) ~R
Standard~S
Optional (rear wheels only) ~W
. end of values.
Void~Void~Void
. end of default/minimum/maximum values.
... end of domain

FIG. 5

MIDDLEWARE FOR BUSINESS TRANSACTIONS

BACKGROUND OF THE INVENTION

1. Field of the Invention

The present invention generally relates to computer software programs, and more particularly, the invention relates to an interface program between a business transaction server and a user interface.

2. Description of the Related Art

Many companies, such as insurance companies and financial service organizations, have come to rely on software systems to help operate their businesses. The software systems may include a program or programs that process and store data associated with business transactions. Such programs may be referred to as business transaction servers. To process a particular business transaction, one or more business transaction servers may be used.

To use a business transaction server, an interface program may be needed to interact between the business transaction server and a user. Typically, the interface program receives input data from the user, transforms the data into a form that is recognizable to the business transaction server, and transmits the data to the server. The server receives the data, processes the data, and the server returns results to the interface program. The interface program receives the results from the server and the interface program may transform the results into a desired output form. The interface program may provide both a graphical user interface to a specific data input source, and a functional interface that communicates with a business transaction server.

There are many different systems and ways in which a user may input data. A system for inputting data into a computer system may be referred to as a "channel." Channels include, but are not limited to, office terminal entry systems, kiosk systems, internet systems, and telephone center assistance systems. A channel may be limited to certain types of transactions. For example, in the insurance industry, a kiosk entry system may be set up to process only insurance quotes, while an office terminal entry system located in an insurance company office may be set up to allow all available types of insurance transactions.

The order in which data is requested from a user for a specific type of transaction may vary depending upon which type of channel is being used. For example, when a telephone assistance center entry system is used, one of the first pieces of information requested from the user is the user's name; while the user's name is often one of the last pieces information requested from a user when using an internet entry system. Because the order in which data is entered for different types of channels may vary, the interface program between a user and a business transaction server may be different for each different channel.

Typically, a company wants the graphical user interface that the company uses to be unique. Even if two companies use the same types of business transaction servers for the same types of business transactions, it is very likely that the graphic user interfaces for the two companies will be different. An interface program supplier may not be able to write one generic set of computer code that functions as an interface program for several different clients.

Typically, programmers write computer code to create a required interface program between a specific type of channel and a business transaction server or servers. If a company wants to offer the ability to enter data through a different type of channel that requires a different mode or layout for data entry, another interface program would have to be written for the new channel. Typically, programmers who create interface programs have to code both a graphical user interface and a functional interface to the business transaction server or servers. Writing computer code to provide the required interfaces typically requires specialist programmers who are familiar with the data requirements of the server, and who are also familiar with the specific requirements of data entry for the channel. Writing computer code to provide interfaces for two different types of channels may result in inefficient duplication of code in separate programs.

Developing an interface system between a user and a business transaction server could take months. One approach towards reducing development time is to use object-oriented software design techniques. Object-oriented software design may include the use of objects and classes. An object may include an encapsulation of data and methods for manipulating the data. A class may include a template for an object. An object is therefore an instance of a class, and an object is created by instantiating it from a class. Object-oriented techniques, when used properly, may permit the re-use of previously written program code such as classes.

SUMMARY OF THE INVENTION

Embodiments disclosed herein include a middleware program that provides a functional interface between a user interface and a business transaction server. A middleware program is a software program that may function as an intermediary between an application program and a control-level program. The middleware program may serve as an intermediary between an interface to a channel and an interface to a business transaction server. The middleware program may allow a user the ability to create a custom user interface for any desired type of channel without the need to create an interface to the business transaction server for each type of channel. The middleware program is expandable and changeable. The middleware program may be expanded or changed to reflect changes due to company policy change, due to regulatory change, or due to other factors.

The middleware program may be written in an object-oriented programming language. The middleware program may be easily extendable to include new objects. Preferably, extensions are created and placed in a customer created file or files. Alternatively, a customer could change the source code to extend the middleware program.

Previously, the development time for creating a functioning interface between a channel and a business transaction server could be months. The middleware program eliminates the need to create an interface between a channel and a business transaction server for each different type of channel. The middleware program may reduce the development time needed to provide a functioning interface system between a user and a business transaction server. If a programmer uses the middleware program, a functioning interface system between a user and a business transaction server may be developed in a few days or less, instead of months. Also, the specialization level of the programmers needed to develop the functional interface system is greatly reduced. Previously, programmers who understood the details of developing an interface between the user and a channel and who understood the details of developing an interface between the channel and the business transaction server were required to develop the interface system between the user and the business transaction server. With the use of the middleware program, programmers who develop the interface system need only have an understanding of the details needed to develop an interface between the user and the channel. The interface between the channel and the business transaction server is already developed and ready for use.

The middleware program functions as an interface between a channel and a business transaction server or servers. The middleware program may make the retrieval, display and updating of data easier to accomplish. The middleware program may allow a programmer to more easily develop a user interface for a computer software system that includes a business transaction server because the programmer does not have to develop computer code that interfaces to the business transaction server. The middleware program may include a variety of support processes. Such support processes may include, but are not limited to, support processes for data validation, support processes for performing syntax validation, and support processes for security checks.

The middleware program may save time, money, and reduce the degree of specialization needed by programmers who write computer code that provides an interface to the business transaction server or servers. The use of the middleware program may also eliminate the inefficient reuse of code in stand-alone programs that provide user interface systems for different types of channels. The use of the middleware program allows companies the opportunity to quickly and inexpensively create interface systems between users and business transaction servers. The user interface between a user and a channel may be customized to the specific technical requirements and aesthetic desires of each individual company.

Changing or modifying existing code of a software program so that the software program functions with a network system may be difficult, time consuming, and prohibitively expensive. Such programs may be referred to as "legacy programs." The middleware program may allow the use of legacy programs on a network system without the need for modification of the legacy program. The middleware program may also allow the processing of business transactions that require access to multiple legacy programs running on different platforms.

BRIEF DESCRIPTION OF THE DRAWINGS

FIG. 5 is a partial listing of a text file of a domain source; and

Figure 1:
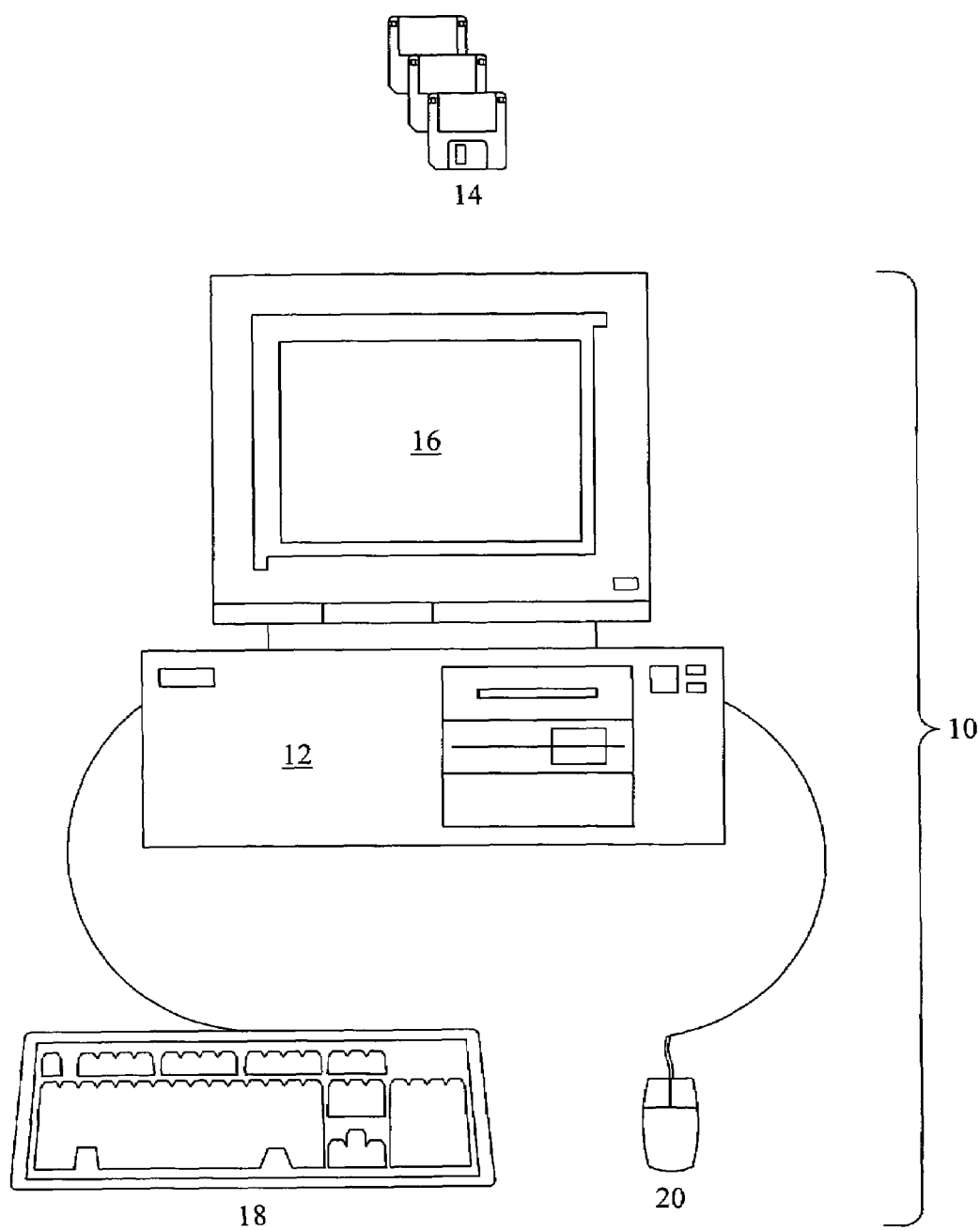
FIG. 1 is an illustration of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. Computer programs may be implemented in software, hardware, or a combination of software and hardware. Computer systems may take various forms, including, but not limited to, personal computer systems, mainframe computer systems, workstations, network appliances, internet appliances, personal digital assistants (PDA's), television systems or other devices. In general, the term "computer system" can be broadly defined to encompass any device having a processor that executes instructions from a memory medium. FIG. 1 shows one embodiment of computer system 10. The computer system may include housing 12, a processor (not shown) that is located within the housing, memory medium such as floppy disks 14, display device such as monitor 16, and input devices such as keyboard 18 and pointing device (mouse) 20.

The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or the memory module may be located in a separate device or a second computer which connects to the first computer over a network. In the latter instance, the second computer provides program instructions to the first computer for execution.

The memory medium preferably stores a software program or programs. The software may be implemented in any of a variety of ways, including procedure-based techniques, component-based techniques, and/or object-oriented techniques, among others. For example, a software program may be implemented using ActiveX controls, C++ objects, JavaBeans, Microsoft Foundation Classes (MFC), or other technologies or methodologies, as desired. Software programs are written in a computer language or computer code. The code that forms a software program may be referred to as the source code of the program.

Computer system software generally includes at least one operating system, such as Windows NT, which is available from the Microsoft Corporation. An operating system is a specialized software program that manages and provides services to other software programs on a computer system. An operating system and the computer hardware that the operating system run on may be referred to as "a platform."

Software may also include one or more programs to perform various tasks on the computer system or on various forms of data that are used by the operating system or other programs. The data may include but is not limited to databases, text files, and graphics files. Computer system software generally is stored in non-volatile memory or on an installation medium. A software program may be copied into a volatile memory when running on the computer system. Data may be read into volatile memory as the data is required by a program.

One type of software program is referred to as a server. A server may be defined as a computer program that, when executed, provides services to other computer programs executing in the same or other computer systems. A client program may be defined as a computer program that calls a server during execution. The computer system on which a server program is executing may be referred to as a server, and such a server may contain a number of server programs and client programs. In the client/server model, a server is a program that fulfills requests from client programs in the same or other computer systems.

As used herein, the term "middleware" is a software program that may function as an intermediary between an application program and a control-level program. The application program may be an interface program between a user and a computer system, and the control-level program may be a server. The middleware program may be a client program that calls a server. For illustration purposes only, the discussion of the middleware program for business transactions detailed herein will be described as being applied to a software system for the insurance industry. A server may process the business transactions. A server that may be used to process business transactions is the COGEN system. The COGEN system is supplied by Computer Sciences Corporation.

As used herein, the term "channel" generally describes any pathway that allows a user to interface with a computer system. Channels may include, but are not limited to, main office entry systems, branch office entry systems, kiosks, call centers, internet systems, and electronic data interchange systems. A channel may be a computer system. For example, the computer system 10 shown in FIG. 1 may be a channel used for an insurance office data entry system, a branch office entry system, or a component of the system used in a call center channel.

Each type of channel may require different implementation systems. For example, a kiosk entry system typically uses a touch-oriented visual screen. Special programming implementations may be needed to transfer data from the kiosk to the computer system. A channel may be implemented so that the channel may only be used for selected types of business transactions. A kiosk system may be set up to only process certain business transactions, such as providing pricing quotes for specified insurance coverage situations. An office data entry system may use a monitor, keyboard and pointing device (mouse) to allow for data entry into a computer system. A call center typically involves the oral communication of data to a person who enters the data into a computer system through a keyboard and/or pointing device. Electronic data entry systems may transfer data from one computer system to another.

A business transaction may be defined as a service provided by a company. For an insurance provider, examples of business transactions include, but are not limited to, adding or deleting clients, tracking payables and receivables, establishing new policies, renewing policies, changing policies, canceling policies, providing pricing quotes for policies, and processing claims based on policies.

Figure 2:
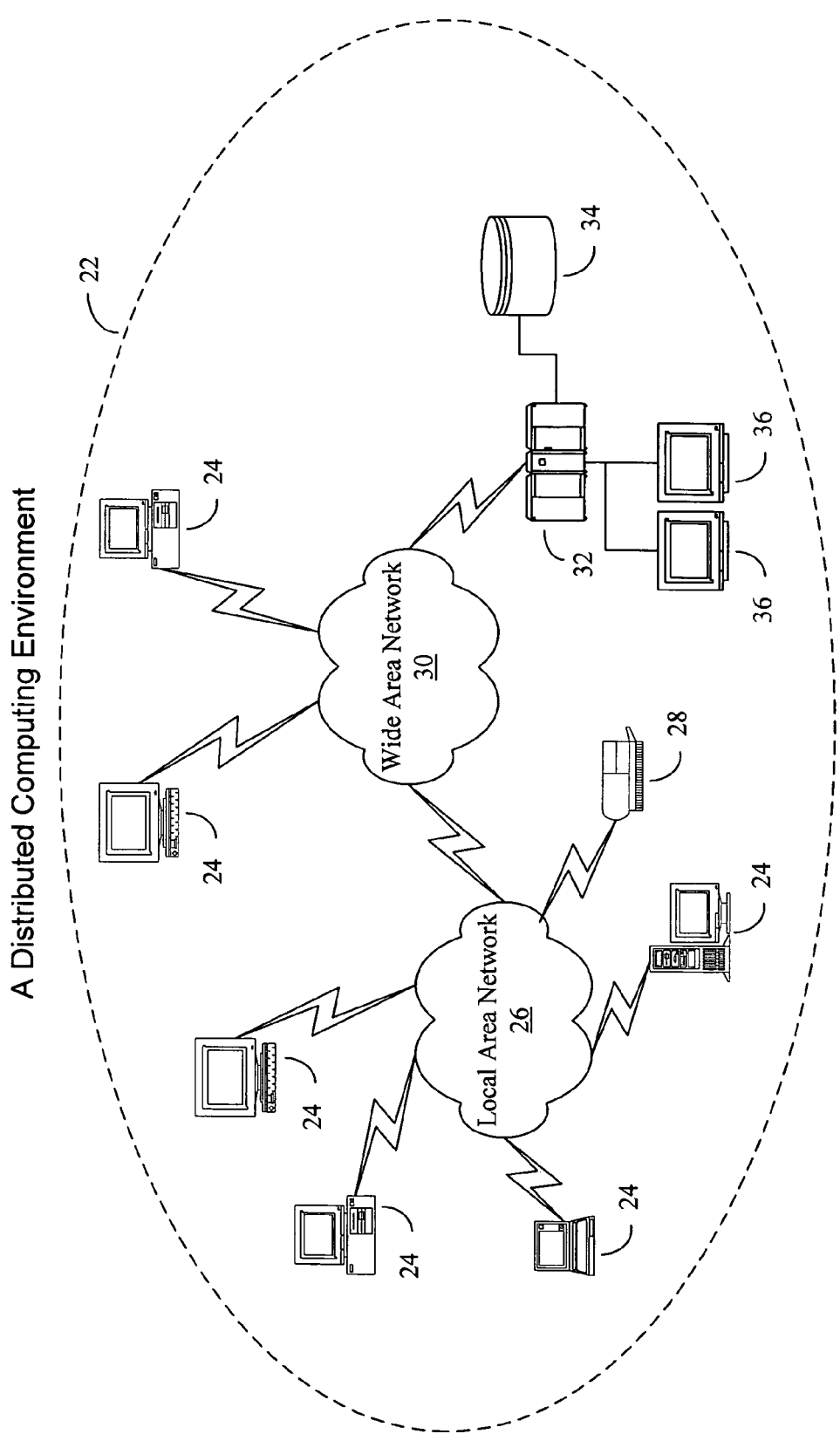
FIG. 2 is an illustration of a networked computer system.

FIG. 2 illustrates distributed or enterprise computing environment 22 according to one embodiment. A distributed computer system or enterprise 22 may include a plurality of channels 24 that are interconnected through one or more networks. Although one particular embodiment is shown in FIG. 2, the distributed computer system 22 may include a variety of heterogeneous channels and networks which are interconnected in a variety of ways and which run a variety of software applications and/or operating system software.

One or more local area networks (LANs) 26 may be included in the enterprise 22. A LAN 26 is a network that spans a relatively small area. Typically, a LAN 26 is confined to a single building or group of buildings. Each node (i.e., channel or device) on a LAN 26 preferably has its own processor that may be used to execute programs. Each node may be able to access data and devices anywhere on the LAN 26. The LAN 26 allows many users to share devices, such as printer 28, as well as data stored on file servers. The LAN 26 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 2, the distributed computer system 22 may include one LAN 26. However, in alternate configurations the distributed computer system 22 may include a plurality of LANs 26 which are coupled to one another through a wide area network (WAN) 30. A WAN 30 is a network that spans a relatively large geographical area.

One or more mainframe computer systems 32 may be coupled to the distributed computer system 22. As shown in FIG. 2, the mainframe computer 32 may be coupled to the distributed computer system 22 through the WAN 30, but alternatively one or more mainframes may be coupled to the distributed computer system through one or more LANs 26. As shown, the mainframe 32 may be coupled to a storage device or file server 34 and mainframe terminals 36. The mainframe terminals 36 may access data stored in the storage device or file server 34 that is coupled to or included in the mainframe computer system 32.

The distributed computer system 22 may include one or more channels 24 that connect to the distributed computer system through the WAN 30. In other words, the enterprise 22 may include one or more channels 24 that are not coupled to the distributed computer system through a LAN 26. For example, the distributed computer system 22 may include channels that are geographically remote from the mainframe 32 and connect to the distributed computer system through the internet.

A business administration system is a computer system that may implement a series of instructions for processing business transactions. A business administration system may include a plurality of channels and servers that may be networked together to form a distributed computing environment. A business administration system may be capable of performing multiple processing tasks. As used herein, a processing task may be defined as a sequence of one or more atomic transactions, or processing steps, associated with a business transaction to be processed by the business administration system. As used herein, an atomic transaction may be defined as a sequence of information exchange and related work that is treated as a unit for the purposes of satisfying a business transaction request and for ensuring data integrity in the administration system. Examples of atomic transactions may include reading a value from a database, updating a field in a database, and filling in a field of a form on a computer screen.

Figure 3:
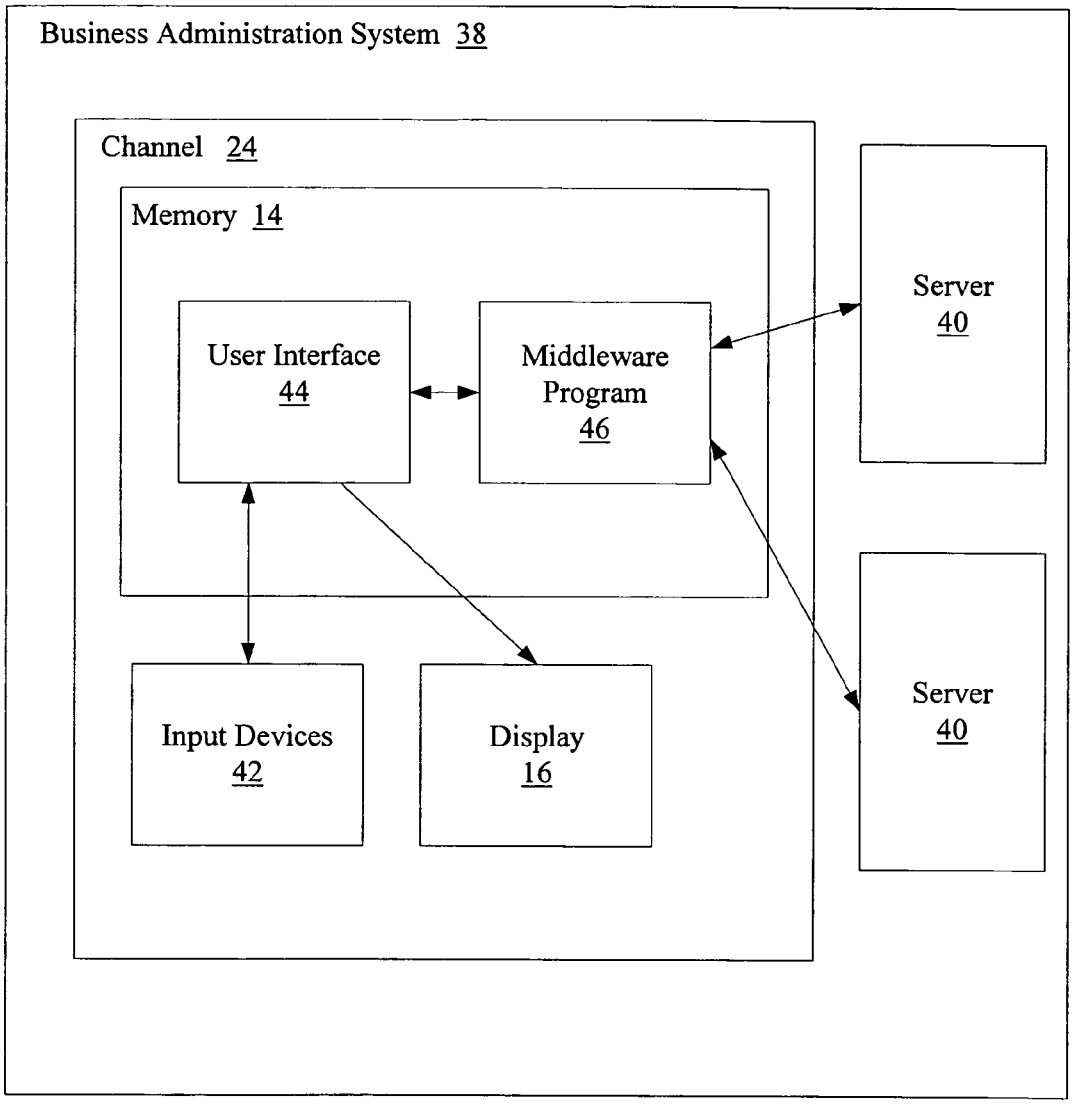
FIG. 3 is a block diagram of a business administration system that uses a middleware program.

FIG. 3 is a diagrammatic representation of an embodiment of insurance administration system 38 for a single channel 24. The insurance administration system 38 may include channel 24 and servers 40. The channel 24 may be any type of channel that provides an interface between a user (not shown) and the administration system 38. The channel may include memory 14, input devices 42, and display 16. The memory 14 may store user interface program 44 and middleware program 46. Upon startup, the user interface program 44 allows a user to enter data and commands through the input devices 42. The input devices 42 may include a keyboard, a touch-screen, a pointing device such as a computer mouse, and/or any other device that allows data and commands to be transferred to a computer system. As data and commands are entered with the input devices 42, the user interface 44 may display a representation of the data and commands on the display device 16. In an embodiment, the display device 16 may be a computer monitor. Data and commands that are entered by a user are transmitted from the user interface 44 to the middleware program 46. When the middleware program 46 receives sufficient data and a command to initiate a business transaction, the middleware program transfers the data to a server 40. The use of more than one server 40 may be required to process a requested business transaction. The server or servers 40 process the data, perform the business transaction, and return the results to the middleware program 46. The middleware program 46 processes the results and returns the results to the user interface 44. The user interface may then transmit the results to the display device 16.

The middleware program 46 may be a cross-platform implementation. A cross-platform implementation works on different computing platforms without alteration. Preferably, the programming interfaces are implemented in the Java™ Language for execution on a Java™ Platform. The Java™ Platform may provide a standard, uniform programming interface that allows Java™ applications to run on any computer system platform. The Java™ Platform is designed to provide this "write once, run anywhere" capability.

The Java™ Language is an object-oriented programming language. In an object-oriented programming language, data and related methods can be grouped together or encapsulated to form an entity known as an object. The object is the fundamental building block of object-oriented programming. The data structures within an object may alternately be referred to as the object's state, its attributes, its fields, or its variables. In the Java™ Language, the data structures are normally referred to as the variables of the object. The procedures that operate on the variables are referred to in Java™ as the methods of the object. The variables and methods of an object may all be referred to as the members of the object.

In object-oriented programming, the grouping together of the variables and methods within an object is referred to as encapsulation. When the variables relating to an object and the methods that might affect the object are encapsulated within the object, other entities usually do not have direct access to these data and procedures. The other entities instead call on the object itself to invoke its own methods and thereby operate on its own data. The encapsulation of the members of the object thereby provides some protection for the data within the object and prevents unauthorized, unwanted, or unintended manipulation of the data. This is sometimes referred to as data hiding. (The concept of data hiding through encapsulation should be distinguished from the hiding of variables in Java™ variable declarations, as explained in more detail below.)

If a user wants to hide the data within an object, the variable that contains the data is made private. Private variables within an object may only be accessed by the methods of the object. Because it may, in some cases, be inconvenient or impractical to require manipulation of certain data through the methods of the associated object, some variables may be made public. These public variables are directly accessible to entities other than the object with which the variables are associated. Thus, in practice, the variables within objects normally comprise some that are hidden or inaccessible and some that are public.

All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects that belong to that class. The definition of the class does not itself create any objects. The class may define initial values for its variables, and the class normally defines the methods associated with the class (i.e., includes the program code which is executed when a method is invoked.) The class may thereby provide all of the program code that will be used by objects in the class, hence maximizing re-use of code which is shared by objects in the class.

Classes in the Java™ Language may be hierarchical. That is, some classes may be subclasses of a higher class, also known as a superclass. In the Java™ Language, the subclass is said to extend the superclass. Alternatively, the superclass is said to be extended by the subclass. For the purposes of this disclosure, a subclass is considered to extend all or any of the classes that are above it in the hierarchy. It may also be said that the subclass directly extends the class immediately above it in the hierarchy, and indirectly extends higher classes in the hierarchy. For example, if a parent class is extended by a first subclass and that subclass is in turn extended by a second subclass, the second subclass can be said to extend the parent class as well as the first subclass.

The hierarchical definition of classes and subclasses based on shared variables and methods is very useful. A subclass includes all the variables and methods in the class of which it is a member (its parent class). The subclass is said to inherit the variables and methods of its parent class. This property is useful in defining subclasses because only those variables and methods that do not appear in the parent class need to be defined in the subclass (although variables or methods which appear in the parent class may be redefined in the subclass.) This allows the code written in the parent classes to be re-used so that the programmer does not have to rewrite or cut and paste code into each new subclass. Methods that are defined in the parent class may, however, be redefined in subclasses. This is referred to as overriding or hiding the previously defined method(s). By redefining a variable that has already been defined in a superclass, the programmer may hide the previously defined variable (which is distinct from the object-oriented data-hiding concept inherent in encapsulation.) In some object-oriented languages, subclasses may inherit variables and methods from several classes. This is called multiple inheritance. If a subclass can only inherit from one parent class, this is called single inheritance. The Java™ Language is characterized by single inheritance, not multiple inheritance.

Hierarchical class structure also allows the programmer to take advantage of a property referred to as polymorphism. Polymorphism is a mechanism by which various objects may be handled in the same way externally, even though there are differences in the way they are handled internally. In other words, the interface that the different objects present to an external entity is the same for each object, but the details of each object's implementation may vary. This allows objects instantiated from different subclasses to be handled identically even though the subclasses are not identical. For example, assume that a drawing program implements a class for shapes, a subclass for circles, and a subclass for squares, each of which has a method called draw( ). While draw( ) will be implemented differently for the circle subclass and the square subclass, the drawing program does not have to know the details of how a shape will be drawn, or even which of the shapes is to be drawn. The drawing program simply calls the draw( ) method for the object to be drawn and the implementation defined in the object's class will be used.

A variable within an object may be shared with another variable of the same type in a different object. When a variable is shared, the variable's value is derived from the current value of another variable, known as the source variable. The source variable must be available in the containment hierarchy of the object declaring the shared attribute. When the value of the shared variable is required, the middleware program 46 searches up the containment hierarchy to find the source variable. Having shared variables allows the middleware program to efficiently track changes to variables within the hierarchical structure. The middleware program may have variables that track the status of other variables. A variable that tracks the status of another variable may denote if the tracked variable remains unchanged, if the variable is pending addition to a database, if the variable is pending deletion from the database, or if the variable has a new value that is to be updated within the database.

Figure 4:
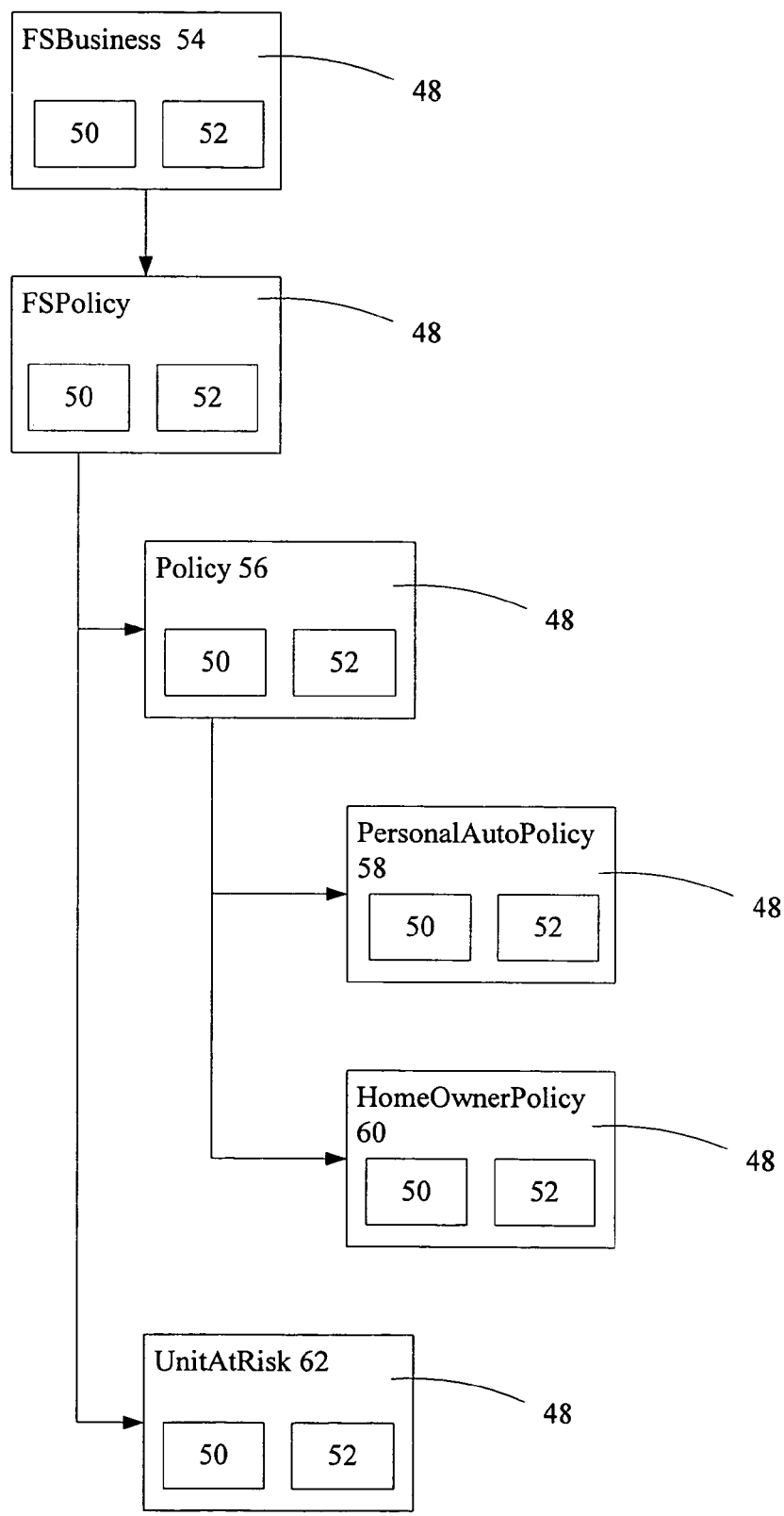
FIG. 4 is a block diagram of a portion of the hierarchical structure of classes for a middleware program.

FIG. 4 shows a possible subset of a hierarchical structure for the middleware program 46. Each class 48 includes variables 50 and methods 52. For each level in the hierarchy, the defined functionality is applied to that particular level and extends to all connected levels beneath it. The variables and methods defined in FSBusiness 54 apply to all the levels shown. The variables and methods defined in Policy 56 apply to PersonalAutoPolicy 58 and HomeOwnerPolicy 60, but the variables and methods defined in Policy do not apply to UnitAtRisk 62. Hierarchy of this type allows variables and methods to be re-used at the lowest level without having to redefine them. The hierarchy also prevents the user from calling methods that do not apply to the situation. For example, the hierarchy may prevent a user working with a home owner policy from attempting to perform a function that applies only to auto policies.

For the middleware program 46, a business object is an instantiation of a defined business class. The business classes define the available functionality that may be requested from the server. Within each class is the definition of all the individual fields or elements that are sent to or retrieved from a server 40, such as the COGEN system. Each class also has defined methods to set and retrieve these fields and to perform business functions on the objects as a whole.

To use the middleware program 46, a user enters data into the user interface 44 with the input devices 42. The user interface 44 transfers the data to the middleware program 46. The middleware program 46 keeps track of which variables have been changed. The middleware program 46 validates the data by checking if the entered value is within the domain of acceptable data. If the entered value is not within the domain, the middleware program sends an error code to the interface program 44. The interface program 44 would have computer code that allows entry of another value for the improperly entered value. The error in the entry of a value may be noticed and corrected before the erroneous value is sent to the business transaction server 40.

A domain defines the valid characteristics for a business field, including, when appropriate, a list of the permissible values that the business field may contain. For example, valid values for marital status might be M=married, S=single, D=divorced, P=separated, and C=common law marriage. If a user mistakenly tries to enter "E" as a value for marital status, an error code would be sent to the user interface program 44. The name of the domain and its associated business field may be stored in a domain-attribute file. A domain source file may define the characteristics and, if appropriate, a listing of the valid values for the domain. A domain manager may be used to serialize both the domain-attribute file and the domain source file for use during program execution.

The attribute-domain source file is a single large text file that consists of statements linking each domain with an associated business field. An example of an entry in the attribute-domain source file that may be used to define a domain for use with the COGEN system is:

csc.fs.pc.policy.pauto.Vehicle~absBrakesCode~
  AbsBrakesCode

This entry states that there is a domain AbsBrakesCode, and that this domain is associated with the absBrakesCode business attribute field on the Vehicle business object in the package csc.fs.pc.policy.pauto. When the attribute domain source file is serialized, the file becomes a single, large serialized file.

The domain source file is a single, continuous text file that contains the source definitions for all domains required by the system. FIG. 5 shows a portion of the statements that may be contained within the domain source file. The statements of FIG. 5 state that there is a domain named "AbsBrakesCode," that the current valid values for the domain are N, O, R, S, and W, and that the English language translations for the code values are as shown. When the domain source file is serialized, the file is broken into separate serialized files for each domain. There may be several hundred serialized domain files during execution.

When the user is ready to initiate a business transaction, the user activates a control on the user interface 44. Activating the control may involve pressing a particular button, clicking or touching a particular area of a display screen, or typing in a particular key sequence. When the user activates the control, the middleware program 46 checks to see if all of the required data needed to perform the transaction is present. For example, policy number is a required piece of data for a business transaction that adds a new beneficiary to an existing insurance policy, and the business transaction cannot be processed if the policy number is not included. If all of the required data to initiate a requested insurance transaction is not present, the middleware program sends an error code to the user interface program.

If all of the required data to perform the requested business transaction is present, the middleware program gets the data that will be sent to the server. The middleware program only sends data that is required for processing the specific business transaction. If necessary, the middleware program puts the data in a required order. For example, assume there are three classes A, B and C, and assume that A contains B and B contains C. The object model dictates the order A-B-C, but the server requires the order C-A-B. A method would be present in the code of the middleware program to override the A-B-C order and substitute the desired order of C-A-B. The server determines ordering requirements and the requirements are coded within the middleware program 46.

After ordering, the middleware program 46 may transform the data to be sent to the server into a form that is required by the server. If necessary, the middleware program 46 may transform values of data into forms that are recognizable to the server 40. For example, a user may enter a value of "M" or "F" to indicate gender, but the server 40 may require that the variable representing gender be either a 0 or a 1. The middleware program 46 would send the appropriate value for gender to the server 40. The process of putting the data into a form that is required by the server 40 is referred to as flattening the data. After the data is flattened, the data is transmitted to the server 40, and the server processes the business transaction.

The server 40 may return results of the business transaction to the middleware program 46. The middleware program 46 may take the results from the server 40 and put the results in a form that is recognizable by the user interface program 44. The process of transforming the results of the server 40 into a form recognizable by the user interface 44 may be referred to as inflating the data. The middleware program 46 transmits the inflated data to the user interface 44, and the user interface may display the results of the business transaction.

Figure 6:
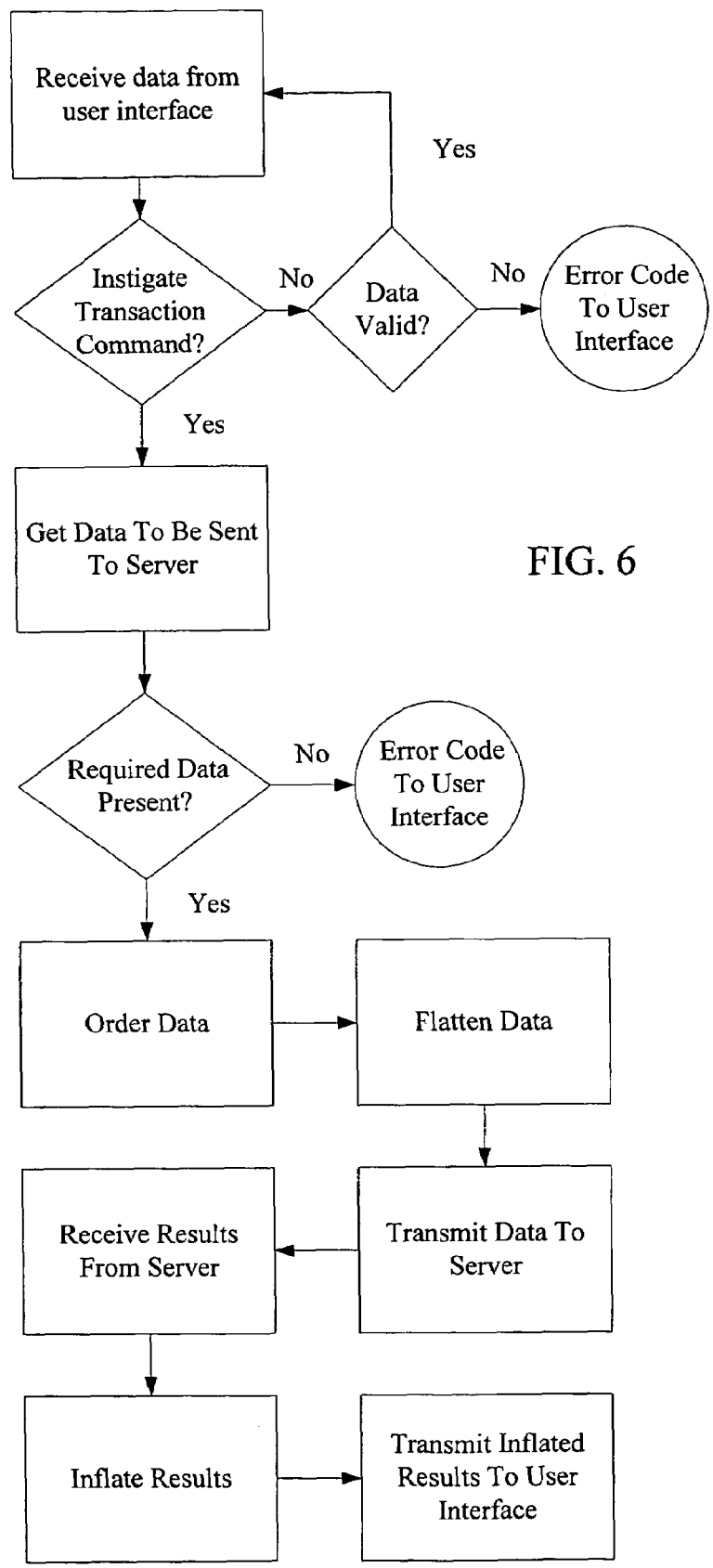
FIG. 6 is a flow diagram indicating the steps performed by the middleware program during the processing of a business transaction.

FIG. 6 depicts the steps that the middleware program 46 performs during the processing of a business transaction. The middleware program 46 receives data from a user interface 44 to a channel 24. The middleware program 46 validates the integrity of the data against the domain of the data. The middleware program 46 receives a command from the interface 44 that indicates that the user wishes to process a business transaction. The middleware program 46 gathers the data to be sent to the server 40 that will process the transaction. The middleware program 46 checks to see if there are values for all of the required variables. If all of the required variables are present, the middleware program 46 orders the data, flattens the data and sends the data to the server. The server processes the data and returns the results to the middleware program 46. The middleware program 46 inflates the results and returns the inflated results to the user interface 44. The user interface may display the results.

The middleware program may be expanded to reflect changes in business policy, changes in regulations, or other changes. The source code of the program may be changed, but it is preferred that the source code of the middleware program remain unaltered. Additions to the middleware program may be coded and placed in packages. The packages extend the functionality of the middleware program. For example, assume a car insurance company desires to instigate a new policy wherein the insurance company grants premium discounts that are a function of the color of the vehicle, but the server that the insurance company uses to perform insurance transactions does not keep track of vehicle color. The new policy may be implemented in a relatively easy manner. The company would have to modify, or have modified, the insurance transaction server so that the server tracks vehicle color and calculates car premiums partially based upon vehicle color. The user interfaces from channels used to access the insurance transaction server would have to be modified so that a value for the vehicle color may be entered. The domain may be extended to reflect the possible values for the new variable. Also, an extension to the middleware program would need to be written that places vehicle color in an appropriate class, validates that a proper value for vehicle color is entered, and transfers the variable representing car color to the insurance transaction server at an appropriate time. The extension may be stored in a package that runs with the middleware program and extends the functionality of the middleware program.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A system comprising:
a server configured to process business transactions;
a domain manager;
a middleware program communicatively coupled to the server, wherein the middleware program comprises a domain file, the domain file comprising a plurality of serialized files generated by the domain manager from a domain source file, the domain source file comprising source definitions for a plurality of domains required by the system to process the business transaction, wherein each of the plurality of serialized files comprises a list of allowable values of a domain associated with one or more business transactions;
a channel communicatively coupled to the middleware program and to the server; and
an interface program communicatively coupled to the channel and to the middleware program, wherein the interface program is configured to receive data from the channel and to receive a command that will initiate a business transaction and transmit the command to the middleware program;
wherein the interface program receives the data from the channel and transmits the data to the middleware program; wherein the middleware program determines whether portions of the received data include allowable values based on one of plurality of serialized files, and wherein the middleware program transforms the data into a form required by the server and transmits the transformed data to the server, wherein the server performs the business transaction after the command to initiate the business transaction has been transmitted to the middleware program and the transformed data is transmitted to the server.

2. The system of claim 1, wherein the middleware program receives a result from the business transaction server and transfers the result to the interface program.

3. The system of claim 1, wherein the channel comprises a kiosk.

4. The system of claim 1, wherein the channel comprises a computer terminal.

5. The system of claim 1, wherein the channel comprises a telephone call center.

6. The system of claim 1, wherein the channel comprises an electronic data transfer system.

7. The system of claim 1, wherein a local area network communicatively couples the channel to the server.

8. The system of claim 1, wherein a wide area network communicatively couples the channel to the server.

9. The system of claim 1, wherein portions of the domain file may be changed without changing code of the middleware program.

10. The system of claim 1, wherein the middleware program generates an error code if the portions of the received data include values that are not allowable values.

11. The system of claim 1, wherein the middleware program transfers data to a plurality of business transaction servers during the processing of a business transaction.

12. The system of claim 1, wherein the middleware program comprises computer code written in an object-oriented programming language.

13. The system of claim 1, wherein the middleware program is extendable without altering source code of the middleware program.

14. The system of claim 13, wherein an extension to the middleware program comprises computer code that is stored in a package and run when the middleware program runs.

15. The system of claim 1, wherein the middleware program overrides an order of data of an object model with an order of data required by the business transaction server before transferring the data to the business transaction server.

16. A carrier medium that stores program instructions, wherein the program instructions are computer-executable to implement a method comprising:
receiving data from one interface program of a plurality of interface programs, wherein each interface program is communicatively coupled to one of a plurality of channels, wherein the data is received by the interface program from the channel to which it is coupled;
determining whether a portion of received data includes values in a list of allowable values in a serialized file using the middleware program, wherein the serialized file is one of a plurality of serialized files in a domain file generated by a domain manager from a domain source file, the domain source file comprising source definitions for a plurality of domains required by a system to process a business transaction, wherein each of the plurality of serialized files comprises a list of allowable values of a domain associated with one or more business transactions;
if the portion of received data does not include values in a list of allowable values, notifying the user interface and receiving corrected data;
if the portion of received data includes values in a list of allowable values, transforming the data into a form required by the business transaction server using the middleware program and transferring the transformed data to a business transaction server;
wherein the program instructions comprise a plurality of objects, wherein at least one of the plurality of objects is used in determining whether the portion of received data includes values in a list of allowable values.

17. The carrier medium of claim 16, wherein the channel comprises a kiosk.

18. The carrier medium of claim 16, wherein the channel comprises a computer terminal.

19. The carrier medium of claim 16, wherein the channel comprises a telephone call center.

20. The carrier medium of claim 16, wherein the channel comprises an electronic data transfer system.

21. The carrier medium of claim 16, wherein a local area network communicatively couples the channel to the server.

22. The carrier medium of claim 16, wherein a wide area network communicatively couples the channel to the server.

23. The carrier medium of claim 16, further comprising a separate set of computer instructions that extend the functionality of the set of computer instructions.

24. The carrier medium of claim 16, wherein the program instructions are further computer-executable to implement:
receiving a result from the business transaction server;
inflating the result; and
transferring the result to the interface program.

25. The carrier medium of claim 16, wherein the middleware program overrides an order of data of an object model with an order of data required by the business transaction server before transferring the data to the business transaction server.

26. A method of performing a business transaction on a computer system using a user interface program, a middleware program, and a business transaction server, the method comprising:
entering data into a channel that communicatively couples to the user interface;
transferring the data to the middleware program;
providing a domain file, the domain file comprising a plurality of serialized files generated by a domain manager from a domain source file, the domain source file comprising source definitions for a plurality of domains required by the computer system to perform the business transaction, wherein each of the plurality of serialized files comprises a list of allowable values of a domain associated with one or more business transactions;
determining whether a portion of the data includes values in a list of allowable values in one of the serialized files using the middleware program,
if the portion of the data does not include values in a list of allowable values, notifying the user interface and receiving corrected data;
if the portion of the data includes values in a list of allowable values:
transforming the data into a form required by the business transaction server using the middleware program;
transferring the transformed data to the business transaction server using the middleware program; and
processing the transformed data using the business transaction server.

27. The method of claim 26, further comprising transferring results from the business transaction server to the middleware program, and transferring results from the middleware program to the user interface.

28. The method of claim 27, wherein the middleware program transforms the results into a form recognizable to the user interface program before transmitting the results to the user interface.

29. The method of claim 26, further comprising generating an error code if an entered data value is not included in the list of allowable values.

30. The method of claim 26, wherein the middleware program determines if all required data to process the business transaction is present before transferring the data to the business transaction server, and wherein the middleware program generates an error code if all the required data is not present before the data is transferred to the business transaction server.

31. The method of claim 26, wherein the middleware program orders the data into an order required by the business transaction server before transferring the data to the business transaction server.

32. The method of claim 26, wherein the middleware program transfers data to and receives results from a plurality of business transaction servers during processing of the business transaction.

33. The method of claim 26, wherein the business transaction server comprises a legacy program.

34. The method of claim 26, further comprising determining if the received data comprises data required to perform the initiated business transaction.

35. The method of claim 26, further comprising placing the received data in order prior to transferring the data to the server.

36. The method of claim 26, wherein the middleware program overrides an order of data of an object model with an order of data required by the business transaction server before transferring the data to the business transaction server.

* * * * *